US012655905B2

(12) United States Patent　　　(10) Patent No.:　US 12,655,905 B2
List et al.　　　(45) Date of Patent:　Jun. 16, 2026

(54) TRANSMISSION DEVICE FOR AN ELECTRICALLY DRIVABLE VEHICLE AXLE, DRIVE DEVICE FOR AN ELECTRICALLY DRIVABLE VEHICLE AXLE, AND VEHICLE

(71) Applicant: ZF Friedrichshafen AG, Friedrichshafen (DE)

(72) Inventors: Matthias List, Friedrichshafen (DE); Tobias Miller, Waldburg (DE); Stefan Borchert, Oberschwarzach (DE); Jörg Buhl, Schonungen (DE); Stephan Hahn, Bundorf (DE); Marco Kiesel, Oerlenbach (DE); Ralph Guehrer, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 104 days.

(21) Appl. No.: 18/494,166

(22) Filed: Oct. 25, 2023

(65) Prior Publication Data

US 2024/0141990 A1　　May 2, 2024

(30) Foreign Application Priority Data

Oct. 26, 2022　(DE) ..................... 10 2022 211 357.8

(51) Int. Cl.
*F16H 63/34*　　(2006.01)
*B60K 1/00*　　(2006.01)
(Continued)

(52) U.S. Cl.
CPC ........... *F16H 63/3458* (2013.01); *B60K 1/00* (2013.01); *B60K 17/08* (2013.01); *F16H 1/20* (2013.01);
(Continued)

(58) Field of Classification Search
CPC .. F16H 63/3458; F16H 63/3425; F16H 63/34; F16H 1/20; F16H 3/44;
(Continued)

(56) References Cited

U.S. PATENT DOCUMENTS 11,226,031 B2　1/2022　Paulik et al.
11,273,802 B2　3/2022　Hanker et al.
(Continued)

FOREIGN PATENT DOCUMENTS

DE　　102011086239 A1　6/2012
DE　　102015214339 A1　2/2017
(Continued)

OTHER PUBLICATIONS

German Search Report DE 10 2022 211 357.8, dated May 15, 2023. (16 pages).

*Primary Examiner* — Farhana Pervin
(74) *Attorney, Agent, or Firm* — Dority & Manning, P.A.

(57)　　　　　ABSTRACT

A transmission device (5) for an electrically drivable vehicle axle (1) includes a transmission input shaft (7), a transmission output shaft (10) connected thereto via gear-wheel pairs (8, 9), and a parking lock device (15). The parking lock device (15) is arranged in a transmission housing (11) and includes an electric actuator (16) for actuating a locking pawl (18) engageable with a parking interlock gear (19) operatively connected to the transmission output shaft (10). The locking pawl and the parking interlock gear (19) are arranged in an interior space (14) of the transmission housing (11) that is acted upon by oil, and the electric actuator (16) is arranged in an oil-free interior space (13) of the transmission housing (11). The output shaft (21) of the electric actuator (16) extends through an intermediate wall (12) and is operatively connected to the locking pawl.

14 Claims, 3 Drawing Sheets

(51) Int. Cl.
    *B60K 17/08*       (2006.01)
    *F16H 1/20*        (2006.01)
    *F16H 3/44*        (2006.01)
    *F16H 57/029*     (2012.01)
    *F16H 57/04*      (2010.01)
    *F16H 57/02*      (2012.01)

(52) U.S. Cl.
    CPC ............. *F16H 3/44* (2013.01); *F16H 57/029*
        (2013.01); *F16H 57/0484* (2013.01); *F16H*
        *57/0495* (2013.01); *F16H 63/3425* (2013.01);
        *B60K 2001/001* (2013.01); *F16H 2057/02026*
        (2013.01); *F16H 2057/02034* (2013.01); *F16H*
        *2057/02052* (2013.01); *F16H 2200/0021*
        (2013.01); *F16H 2200/0034* (2013.01); *F16H*
        *2200/2005* (2013.01)

(58) Field of Classification Search
    CPC .............. F16H 57/029; F16H 57/0484; F16H
        57/0495; F16H 2057/02026; F16H
        2057/02034; F16H 2057/02052; F16H
        57/0483; F16H 2200/0021; F16H
        2200/0034; F16H 2200/2005; F16H
        59/02; F16H 59/08; B60K 1/00; B60K
        17/08; B60K 2001/001
    See application file for complete search history.

(56)           References Cited

U.S. PATENT DOCUMENTS

| 11,614,166 B2 | 3/2023 | Wetzel et al. |
| 11,773,973 B2 | 10/2023 | Tamura |

| 2011/0011204 A1* | 1/2011 | Ueno ..................... F16H 63/48 |
| | | 74/606 R |
| 2014/0231213 A1* | 8/2014 | Isomura .............. F16H 63/3425 |
| | | 192/219.5 |
| 2019/0154149 A1* | 5/2019 | Gruber ..................... B60K 1/00 |
| 2020/0072351 A1* | 3/2020 | Chen .................... F16D 63/006 |
| 2021/0126498 A1* | 4/2021 | Großpietsch ............ B60K 6/26 |
| 2021/0239210 A1 | 8/2021 | Miebach et al. |
| 2021/0396309 A1* | 12/2021 | Wetzel .................. F16H 57/029 |
| 2022/0049768 A1* | 2/2022 | Nakamatsu ......... F16H 57/0457 |
| 2022/0145980 A1* | 5/2022 | Oda ...................... B60K 6/405 |
| 2022/0178442 A1* | 6/2022 | Matsuo .............. F16H 63/3433 |
| 2022/0243811 A1* | 8/2022 | Matsuo .............. F16H 63/3433 |
| 2022/0282789 A1* | 9/2022 | Tamura .............. F16H 63/3433 |
| 2023/0001793 A1 | 1/2023 | Furstenhofer et al. |
| 2023/0074092 A1* | 3/2023 | Vasanadu ............ F16H 63/3458 |
| 2023/0256801 A1* | 8/2023 | Kida .................. F16H 63/3466 |
| | | 180/65.6 |

FOREIGN PATENT DOCUMENTS

| DE | 102018212189 A1 | 1/2020 |
| DE | 102018216728 A1 | 4/2020 |
| DE | 112019004892 T5 | 7/2021 |
| DE | 102020204504 A1 | 10/2021 |
| DE | 102022104958 A1 | 9/2022 |
| EP | 2263899 A2 | 12/2010 |
| WO | WO 2018/099654 A1 | 6/2018 |
| WO | WO 2021/105082 A1 | 6/2021 |

* cited by examiner

TRANSMISSION DEVICE FOR AN ELECTRICALLY DRIVABLE VEHICLE AXLE, DRIVE DEVICE FOR AN ELECTRICALLY DRIVABLE VEHICLE AXLE, AND VEHICLE

CROSS-REFERENCE TO RELATED APPLICATION

The present application is related and has right of priority to German Patent Application No. DE102022211357.8 filed on Oct. 26, 2022, which is incorporated by reference in its entirety for all purposes.

FIELD OF THE INVENTION

The present invention relates generally to a transmission device for an electrically drivable vehicle axle, to a drive device for an electrically drivable vehicle axle, and to a vehicle having such an electrically drivable vehicle axle.

BACKGROUND

WO 2021/105082 A1 describes a transmission device and a drive device for an electrically drivable vehicle, and a vehicle designed with such a drive device. The transmission device includes a transmission element, a parking lock and a transmission housing. The transmission element is interlockable by the parking lock. In addition, the parking lock includes a parking lock actuator. The transmission element and the parking lock are arranged in the transmission housing. A connection device is also provided, the connection device including a cable arrangement, which extends in the transmission housing, and a plug connector. A pressure-compensating device extends through the plug connector of the connection device and forms a gas-permeable connection between the interior of the parking lock actuator and the exterior of the transmission housing.

Due to the pressure-compensating device, operational failures of the parking lock actuator are to be avoided, the operational failures frequently resulting from lubricant penetrating the parking lock actuator. This penetration is due to a pressure difference between the interior of the parking lock actuator and the surroundings. By the pressure-compensating device, pressure is to be compensated between the interior of the parking lock actuator and the exterior of the transmission housing and the lubricant is to be prevented from penetrating the parking lock actuator.

It is problematic, however, that pressure compensation between the interior of the parking lock actuator and the exterior of the transmission housing is ensured only when the pressure-compensating device operates as specified.

SUMMARY OF THE INVENTION

Example aspects of the present invention reduce or eliminate at least one disadvantage of a known approach or to provide an alternative approach. Example aspects of the invention, in particular, provide a transmission device and a drive device of an electrically drivable vehicle axle and a vehicle having such an electrically drivable vehicle axle, which are improved with regard to at least one of the following factors: feasibility, manufacturing time, manufacturing costs, complexity of manufacturing, utilization of installation space, operational reliability, sustainability, and/ or component reliability. Further example aspects can arise from the advantageous effects of the technology disclosed here.

One particularly preferred example aspect of the present invention provides a transmission device and a drive device of an electrically drivable vehicle axle and a vehicle having such an electrically drivable vehicle axle, each of which includes a parking lock device, the mode of operation of which is independent of a pressure compensation between an interior of an actuator of the parking lock device and the surroundings of a transmission housing.

The transmission device according to example aspects of the invention for an electrically drivable vehicle includes a transmission input shaft, which is connected to a transmission output shaft via gear-wheel pairs. Furthermore, the transmission device includes a parking lock device, via which the transmission output shaft is rotationally fixable.

The parking lock device is arranged in a housing of the transmission device or in a transmission housing and includes an electric actuator for actuating a locking pawl. The locking pawl is engageable with or disengageable from a parking interlock gear, which is operatively connected to the transmission output shaft, by the electric actuator.

According to example aspects of the invention, the locking pawl and the parking interlock gear are arranged in an interior space of the transmission housing that is acted upon by oil and the electric actuator is arranged in an oil-free interior space of the transmission housing. The output shaft of the electric actuator extends through an intermediate wall, which separates the interior space that is acted upon by oil from the oil-free interior space. The actuator is operatively connected to the locking pawl on the side of the intermediate wall facing away from the oil-free interior space.

Due to the intermediate wall according to example aspects of the invention, it is ensured in a structurally simple manner that the actuator is not acted upon by oil as a function of the pressure conditions in the interior of the actuator and outside the transmission housing. It is therefore ensured in a structurally simple and economical manner that the mode of operation of the parking lock device is not adversely affected by oil entering the interior of the actuator.

In a transmission device that can be at least partially preassembled with little effort, the actuator is fastened on the intermediate wall on the side of the intermediate wall facing the oil-free space.

In addition, it is possible to design the intermediate wall with the actuator and a parking lock mechanism of the parking lock as a module that can be preassembled when the parking lock mechanism is fastened on the intermediate wall on the side of the intermediate wall facing away from the oil-free space.

If the parking interlock gear is connected to the transmission input shaft for conjoint rotation, a drive output of an electrically drivable vehicle axle, which is designed with the transmission device, can be easily rotationally fixed or released by the parking lock.

The parking interlock gear can be connected to an intermediate shaft for conjoint rotation, the intermediate shaft being connected to the transmission output shaft and to the transmission input shaft via the gear-wheel pairs. As a result, existing transmission concepts and transmission systems are easily implementable in a sense according to example aspects of the invention, since installation spaces in the area of an intermediate shaft that are available in the interior of the transmission housing of existing transmission systems are usable for the placement of the parking interlock gear.

In a structurally simple embodiment of the transmission device according to example aspects of the invention, the output shaft of the actuator is rotatably mounted in an actuator housing. In addition, the actuator housing can be sealingly connected to the intermediate wall at least in the area in which the output shaft extends through the intermediate wall. An interior space of the actuator housing can be sealed with respect to the interior space of the transmission housing that is acted upon by oil via a sealing unit between the actuator housing and the output shaft in order to prevent, in a structurally simple manner, the actuator from being acted upon by oil from the interior space that is acted upon by oil.

In a development of the transmission device according to example aspects of the invention that is favorable in terms of installation space and is implementable with a high sealing effect, the actuator housing rests via one end face against the lateral face of the intermediate wall facing the oil-free interior space. A seal is provided in the contact area between the actuator housing and the intermediate housing, via which the interface between the actuator housing and the intermediate wall can be protected, in a structurally simple manner with a high sealing effect, against oil penetrating the oil-free space from the interior space that is acted upon by oil.

In one development of the transmission device according to example aspects of the invention, the actuator housing engages into an opening in the intermediate wall. In such an example embodiment of the transmission device, the oil-free interior space of the transmission housing is sealable via a seal with respect to the space that is acted upon by oil, the seal being arranged in the area of the opening radially between the intermediate wall and the actuator housing.

In a structurally simple and installation space-favorable embodiment of the transmission device according to example aspects of the invention, the gear-wheel pairs in the transmission device according to example aspects of the invention have spur gears, which at least partially intermesh and are arranged on the transmission input shaft, the intermediate shaft and the transmission output shaft.

When the gear-wheel pairs are at least partially mutually engaging gear wheels in a planetary gear set, the transmission device according to example aspects of the invention is characterized by a high power density.

The transmission device according to example aspects of the invention can be designed with at least one shift element for engaging and disengaging two different gear stages. As a result, it is possible to highly efficiently operate an electric machine, which is provided for driving, across the entire operating range of an electrically drivable vehicle axle, which is designed with the transmission device according to example aspects of the invention.

Furthermore, a drive device for an electrically drivable vehicle axle having an electric machine, an inverter for the electric machine and having a transmission device according to example aspects of the invention, which is described in greater detail above, is provided. An output shaft of the electric machine is connected to the transmission input shaft in order to be able to electrically drive a vehicle axle, which is designed with such a drive device, in a structurally simple manner.

In the present case, an inverter also refers, among other things, to a power electronics system in the electric machine, by which direct current provided by an electric storage device is converted into alternating current in order to supply the electric machine with the alternating current when the electric machine is operated as a motor. In addition, alternating current generated in the area of the electric machine when operated as a generator is converted in the area of the inverter or in the area of the power electronics system into direct current in order to be able to charge the associated electric storage device.

In a development of the drive device according to example aspects of the invention, the electric machine, the inverter and the transmission device are arranged in the transmission housing, the inverter and the actuator being arranged in the oil-free interior space of the transmission housing. Therefore, the components of the actuator and also the inverter are located in the oil-free interior space of the transmission housing, which is sealed off from environmental influences. The seals prevent oil from leaking out of the space that is acted upon by oil in the direction of the oil-free space, which is also referred to as the inverter space, between the actuator housing and the intermediate wall and between the output shaft of the actuator and the intermediate wall.

Example aspects of the invention also provide an electrically drivable vehicle axle, which includes a drive device according to example aspects of the invention, which is configured for driving the vehicle. In addition, example aspects of the invention provide a vehicle that is designed with an electrically drivable vehicle axle, which is designed according to example aspects of the invention.

Overall, the transmission device according to example aspects of the invention provides efficient and installation space-neutral protection against theft due to the fact that the actuator, in addition to associated cable connections and associated locking components, is integrated into the transmission housing, in which the inverter is also arranged.

The integration of the actuator into the transmission housing and the oil-tight separation of the actuator from the parking lock mechanism, which is arranged in the interior space of the transmission that is acted upon by oil, also offers the possibility of designing the drive device according to example aspects of the invention and an electrically drivable vehicle designed therewith to be designed without separate theft protection. Furthermore, the drive device according to example aspects of the invention can be designed without complex protective measures against environmental influences, such as water, salt, dust or the like.

The embodiments according to example aspects of the invention of the device according to example aspects of the invention and of the electric vehicle according to example aspects of the invention offer the possibility of efficiently using available installation space and also implementing various parking-lock actuating concepts, with little complexity.

It is possible, for example, to design the parking lock with a normally-closed functionality, a normally-open functionality, and to preferably combine each of these functionalities with an emergency release function or with an emergency engagement function of the parking lock device.

The invention is not limited to the specified combination of features of the independent claims or the claims dependent thereon. In addition, individual features can be combined with one another, provided they arise from the claims, the description of embodiments that follows, or directly from the drawings. References in the claims to the drawings via the use of reference characters is not intended to limit the scope of protection of the claims.

BRIEF DESCRIPTION OF THE DRAWINGS

Exemplary embodiments of the invention are explained in greater detail with reference to the drawings, without being limited thereto. Therein.

DETAILED DESCRIPTION

Figure 1:
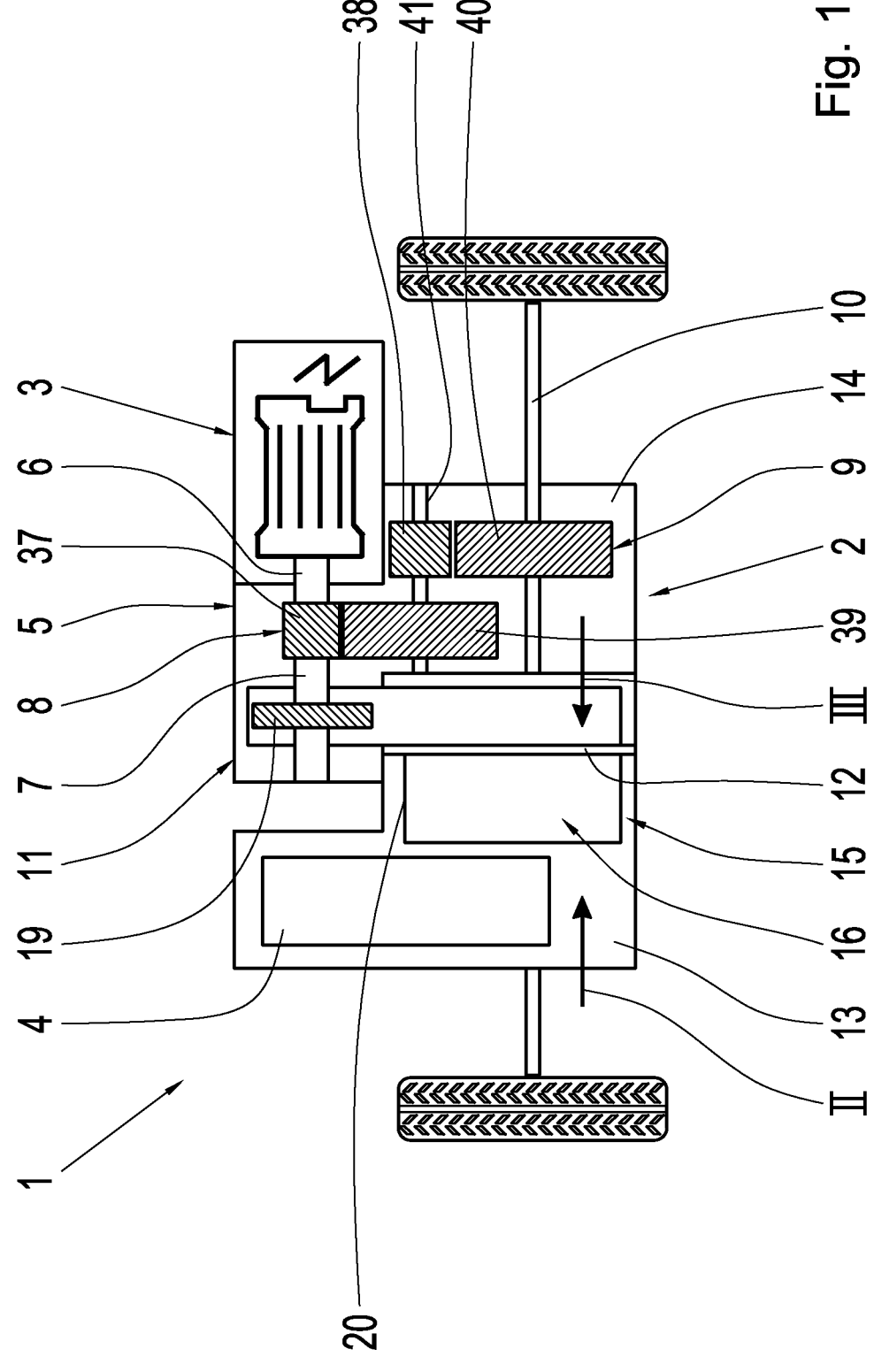
FIG. 1 shows a simplified view of an electrically drivable vehicle axle of a vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a highly simplified view of an electrically drivable vehicle axle 1 with a drive device 2. The drive device 2 includes an electric machine 3, an inverter 4 for the electric machine 3 and a transmission device 5. An output shaft 6 of the electric machine 3 is coaxial to a transmission input shaft 7 of the transmission device 5 and is connected thereto for conjoint rotation.

The transmission input shaft 7 is operatively connected to a transmission output shaft 10 via gear-wheel pairs 8, 9 of the transmission device 5. The electric machine 3, the inverter 4 and the transmission device 5 are arranged in a transmission housing 11 and in a housing of the drive device 2. An intermediate wall 12 separates an interior of the transmission housing 11 into an oil-free interior space 13 and into an interior space 14 which is acted upon by oil.

Figure 2:
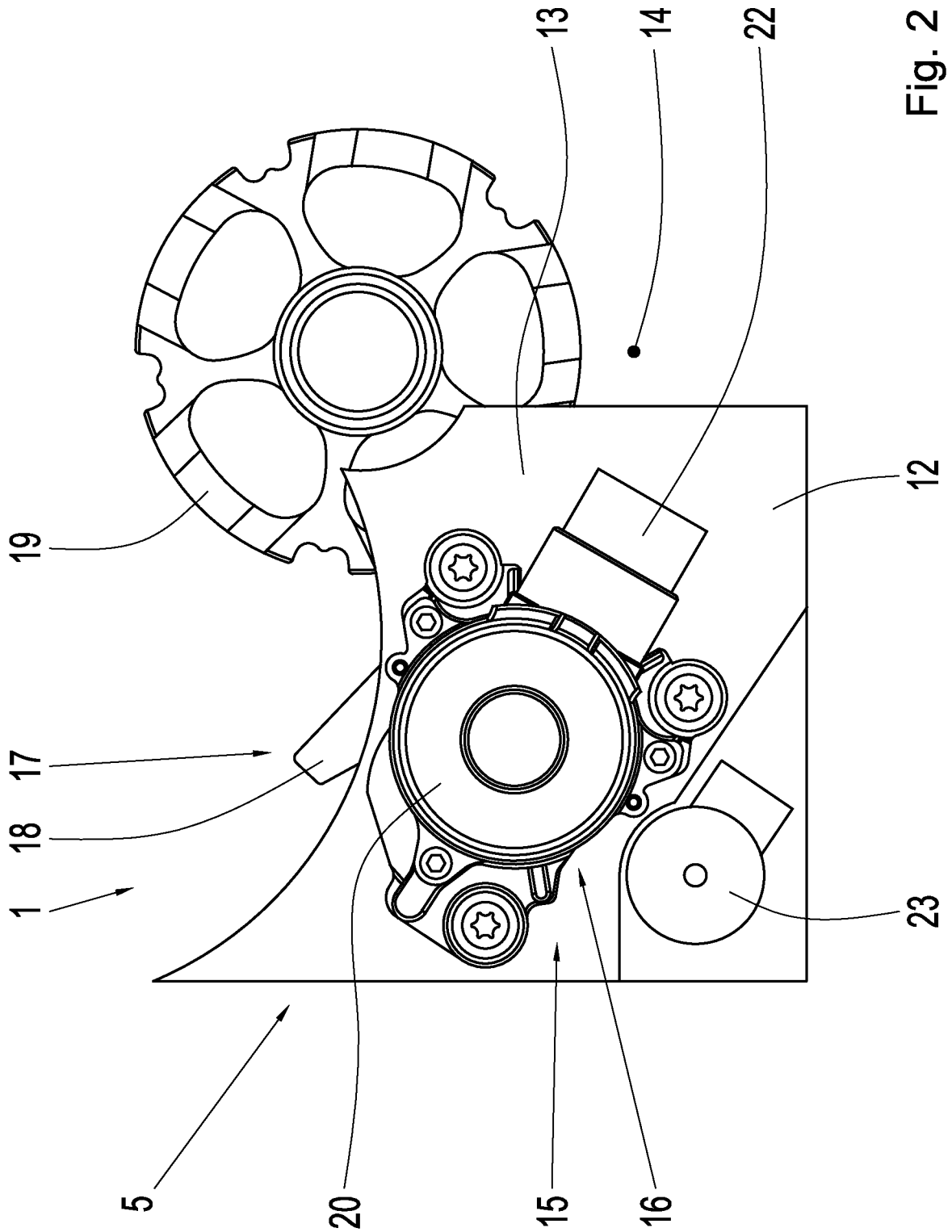
FIG. 2 shows a side view of a portion of a drive device of the vehicle axle according to FIG. 1 from a view II characterized in greater detail in FIG. 1.
Figure 3:
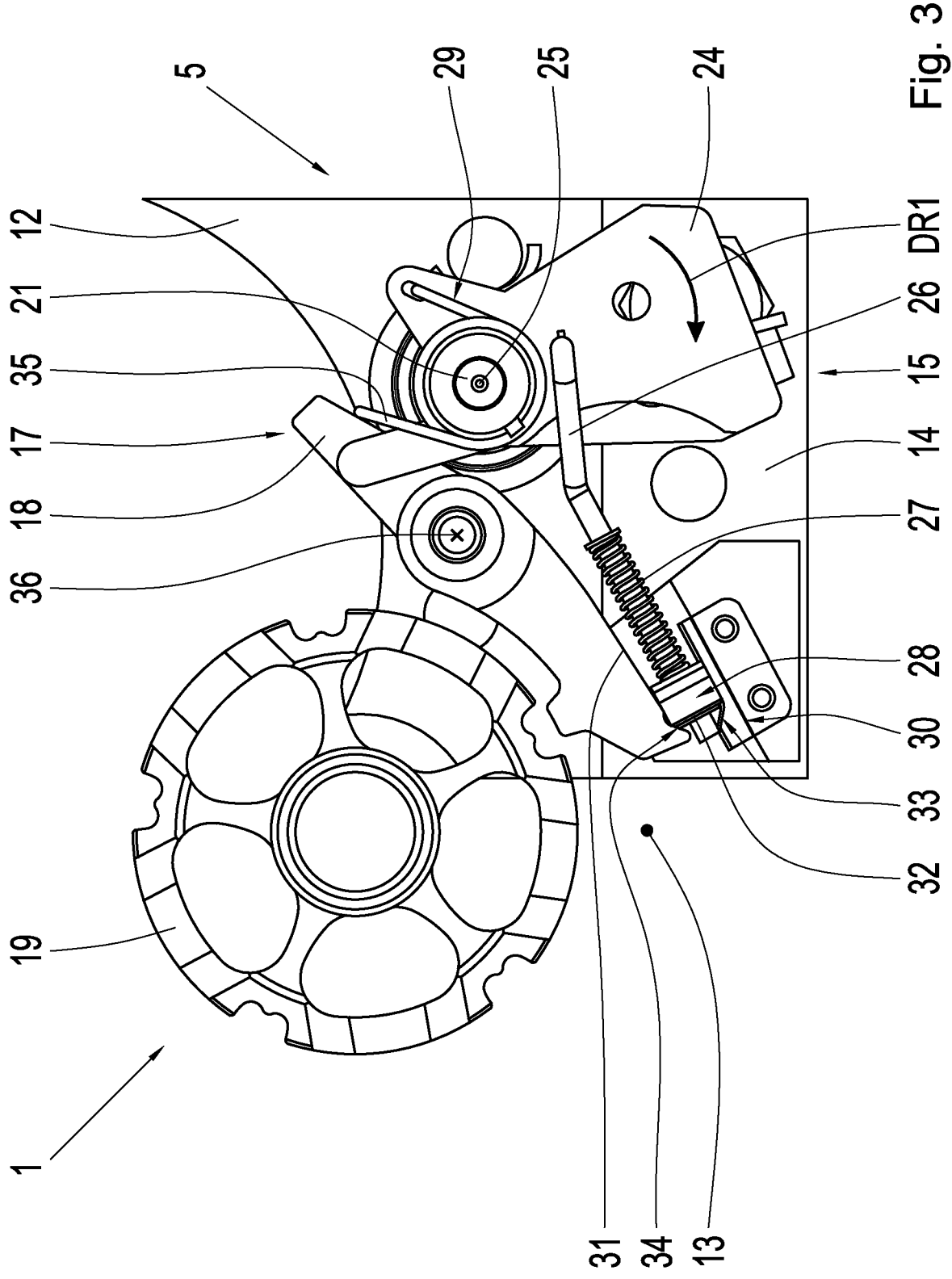
FIG. 3 shows a side view of another portion of the drive device according to FIG. 2 from a view III described in greater detail with reference to FIG. 1.

In the switched-off operating state of the drive device 2, the electric machine 3 does not provide torque at the transmission input shaft 7, and so the transmission output shaft 10 is freely rotatable. In order to prevent the vehicle designed with the electrically drivable vehicle axle 1 from unintentionally rolling away in the switched-off state, in particular on an incline, the transmission device 5 also includes a parking lock device 15. The transmission output shaft 10 is rotationally fixable via the parking lock device 15. For this purpose, the parking lock device 15 includes an electric actuator 16, which is shown in greater detail in FIG. 2. A parking lock mechanism 17 is actuatable by the electric actuator 16. The parking lock mechanism 17 is shown in FIG. 3 and includes a locking pawl 18, among other things. The locking pawl 18 is engageable with or disengageable from a parking interlock gear 19 when appropriately actuated by an actuator. In the exemplary embodiment of the electrically drivable vehicle axle shown in FIG. 1, the parking interlock gear 19 is arranged on the transmission input shaft 7 in a rotationally fixed manner.

In order to avoid a mode of operation of the actuator 16 due to oil entering a housing 20 of the actuator 16, the actuator 16 is fixedly mounted on the intermediate wall 12 on the side of the intermediate wall 12 that faces the oil-free interior space 13. For the actuator-side actuation of the parking lock mechanism 17, the output shaft 21 of the actuator 16 extends through the intermediate wall 12. In order to prevent oil from the interior space 14 that is acted upon by oil from entering the oil-free interior space 13 through the intermediate wall 12, which is undesirable, a sealing unit (not shown in greater detail) is provided between the output shaft 21 of the actuator 16 and the intermediate wall.

In addition to the actuator 16, an electric plug unit 22 is arranged in the oil-free interior space 13, via which the actuator 16 is actuated and actuatable in a desired manner. In addition, a solenoid 23 is also fixedly fastened on the intermediate wall 12 in the oil-free interior space 13. The solenoid 23 is provided for locking the parking lock mechanism 17 in the engaged state or in the disengaged state of the parking lock device 15 as a function of the particular current application.

The parking lock mechanism 17 is designed with a lever element 24, which is connected to the output shaft 21 of the actuator 16 for conjoint rotation and, when appropriately driven by the actuator 16 in a rotary manner, is swiveled about the rotational axis 25 of the output shaft 21 of the actuator 16. The lever element 24 is connected to an actuating rod 26, on which a spring element 27 and a blocking element 28 are provided, the blocking element 28 being spring-loaded by the spring element 27 and arranged on the actuating rod 26 in a longitudinally displaceable manner.

FIG. 3 shows the parking lock device 15 in the disengaged operating state, in which the locking pawl 18 is disengaged from the parking interlock gear 19. The locking pawl 18 is held in disengagement from the parking interlock gear 19 by another spring element 29, which is operatively connected to the lever element 24.

The blocking element 28 is arranged, in the present case, between a housing-fixed guide element 30, which is fixedly connected to the intermediate wall 12, and on a side 31 of the locking pawl 18 facing away from the parking interlock gear 19, and rests via a conical area 32 against bevels 33, 34 of the guide element 30 and of the locking pawl 18, the bevels 33, 34 extending toward one another.

In order to engage the parking lock device 15, the actuator 16 turns the lever element 24 in the direction of rotation or swivel direction indicated in FIG. 3 with the reference character DR1. As a result, the actuating rod 26 is displaced in the direction of the blocking element 28. The spring element 27 is compressed for as long as it takes until the blocking element 28 is displaced against the spring force of the other spring element 29 along the bevels 33 and 34 and the locking pawl 18 engages with the parking interlock gear 19. This is the case when the lever element 24 is displaced by the actuator 16 in the swivel direction DR1 to such an extent that an actuating force, which is imparted upon the lever element 24 by a spring leg 35 of the other spring element 29, drops to a level such that the locking pawl 18 is swivelable about a rotational axis 36 and is engageable with the parking interlock gear 19.

The gear-wheel pairs 8 and 9 are spur gear sets in the present case and include a first spur gear 37 and 38, respectively, and a second spur gear 39 and 40, respectively. The first spur gear 37 in the first gear-wheel pair is arranged on the transmission input shaft 7 in a rotationally fixed manner and meshes with the second spur gear 39 in the first gear-wheel pair 8. The second spur gear 39 in the first gear-wheel pair 8 is arranged on the intermediate shaft 41 in a rotationally fixed manner, on which intermediate shaft 41 the first spur gear 38 in the second gear-wheel pair 9 is mounted in a rotationally fixed manner. The first spur gear 38 in the second gear-wheel pair 9 meshes with the second spur gear 40, which is arranged on the transmission output shaft 10 in a rotationally fixed manner.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 vehicle axle
2 drive device
3 electric machine
4 inverter
5 transmission device
6 output shaft of the electric machine
7 transmission input shaft
8 first gear-wheel pair
9 second gear-wheel pair
10 transmission output shaft
11 transmission housing and housing of the drive device
12 intermediate wall
13 oil-free interior space
14 interior spaced acted upon by oil
15 parking lock device
16 electric actuator
17 parking lock mechanism
18 locking pawl
19 parking interlock gear
20 actuator housing
21 output shaft of the actuator
22 electric plug unit
23 solenoid
24 lever element
25 rotational axis of the output shaft of the actuator
26 actuating rod
27 spring element
28 blocking element
29 further spring element
30 guide element
31 side of the locking pawl
32 conical area of the blocking element
33 bevel of the guide element
34 bevel of the locking pawl
35 spring leg of the further spring element
36 rotational axis of the locking pawl
37 first spur gear in the first gear-wheel pair 8
38 first spur gear in the second gear-wheel pair 9
39 second spur gear in the first gear-wheel pair 8
40 second spur gear in the second gear-wheel pair 9
41 intermediate shaft
DR1 direction of rotation
The invention claimed is:

1. A transmission device (5) for an electrically drivable vehicle axle (1) comprising:
a transmission housing (11);
a transmission input shaft (7);
a transmission output shaft (10) connected to the transmission input shaft (7) via gear-wheel pairs (8, 9); and
a parking lock device (15), the transmission output shaft (10) being rotationally fixable via the parking lock device (15), the parking lock device (15) being arranged in the transmission housing (11), the parking lock device (15) comprising an electric actuator (16) for actuating a locking pawl (18) engageable with or disengageable from a parking interlock gear (19) operatively connected to the transmission output shaft (10),
wherein the locking pawl (18) and the parking interlock gear (19) are arranged in an interior space (14) of the transmission housing (11) that is acted upon by oil, and the electric actuator (16) is arranged in an oil-free interior space (13) of the transmission housing (11),
wherein an output shaft (21) of the electric actuator (16) extends through an intermediate wall (12) separating the interior space (14) that is acted upon by oil from the oil-free interior space (13), and the electric actuator (16) is operatively connected to the locking pawl (18) on a side of the intermediate wall (12) facing away from the oil-free interior space (13), and
wherein an actuator housing (20) of the electric actuator (16) is within the oil-free interior space (13) of the transmission housing (11).

2. The transmission device of claim 1, wherein the electric actuator (16) is fastened on the intermediate wall (12) on a side of the intermediate wall (12) facing the oil-free interior space (13).

3. The transmission device of claim 1, wherein a parking lock mechanism (17) includes the locking pawl (18) and interacts with the output shaft (21) of the electric actuator (16), the parking lock mechanism (17) fastened on the intermediate wall (12) on the side of the intermediate wall (12) facing away from the oil-free interior space (13).

4. The transmission device of claim 1, wherein the parking interlock gear (19) is connected to the transmission input shaft (7) for conjoint rotation.

5. The transmission device of claim 1, wherein the parking interlock gear (8) is connected to an intermediate shaft (41) for conjoint rotation, the intermediate shaft (41) connected to the transmission output shaft (10) and to the transmission input shaft (7) via the gear-wheel pairs (8, 9).

6. The transmission device of claim 1, wherein:
the output shaft (21) of the electric actuator (16) is rotatably mounted in an actuator housing (20), and the actuator housing (20) is sealingly connected to the intermediate wall (12) at least where the output shaft (21) extends through the intermediate wall (12); and
an interior space of the actuator housing (20) is sealed with respect to the interior space (14) of the transmission housing (11) that is acted upon by oil via a sealing unit between the actuator housing (20) and the output shaft (21).

7. The transmission device of claim 1, wherein an actuator housing (20) rests via one end face against the lateral face of the intermediate wall (12) facing the oil-free interior space (13), and a seal is disposed in a contact area between the actuator housing (20) and the intermediate wall (12).

8. The transmission device of claim 1, wherein:
an actuator housing (20) engages into an opening in the intermediate wall (12), and the oil-free interior space (13) of the transmission housing (11) is sealed via a seal with respect to the interior space (14) that is acted upon by oil; and
the seal is disposed in an area of the opening radially between the intermediate wall (12) and the actuator housing (20).

9. The transmission device of claim 1, wherein the gear-wheel pairs (8, 9) comprise spur gears (37, 38, 39, 40), which at least partially intermesh and are arranged on the transmission input shaft (7), an intermediate shaft (41) and the transmission output shaft (10).

10. A drive device (2) for an electrically drivable vehicle axle (1), comprising:

an electric machine (3);

an inverter (4) for the electric machine (3); and the transmission device (5) of claim 1, wherein an output shaft (6) of the electric machine (3) is connected to the transmission input shaft (7).

11. The drive device of claim 10, wherein:

the electric machine (3), the inverter (4), and the transmission device (5) are arranged in the transmission housing (11); and the inverter (4) and the electric actuator (16) of the parking lock device (15) are arranged in the oil-free interior space (13) of the transmission housing (11).

12. An electrically drivable vehicle axle (1), comprising the drive device (2) of claim 10 for electrically driving a vehicle.

13. The transmission device of claim 1, wherein the parking lock device (15) is arranged fully within the transmission housing (11).

14. The transmission device of claim 1, wherein the electric actuator (16) of the parking lock device (15) is arranged within the transmission housing (11).

\*　\*　\*　\*　\*